United States Patent
Orazem (10) Patent No.: US 11,124,161 B2
(45) Date of Patent: Sep. 21, 2021

(54) HEATED LICENSE PLATE SYSTEM

(71) Applicant: Robert Anthony Orazem, Onamia, MN (US)

(72) Inventor: Robert Anthony Orazem, Onamia, MN (US)

(*) Notice: Subject to any disclaimer, the term of this patent is extended or adjusted under 35 U.S.C. 154(b) by 410 days.

(21) Appl. No.: 16/193,780

(22) Filed: Nov. 16, 2018

(65) Prior Publication Data

US 2019/0232924 A1  Aug. 1, 2019

Related U.S. Application Data

(60) Provisional application No. 62/622,406, filed on Jan. 26, 2018.

(51) Int. Cl.
   *B60S 1/66* (2006.01)
   *B60R 13/10* (2006.01)
   *B60S 1/56* (2006.01)

(52) U.S. Cl.
   CPC ............... *B60S 1/66* (2013.01); *B60R 13/10* (2013.01); *B60S 1/563* (2013.01)

(58) Field of Classification Search
   CPC . B60S 1/66; B60S 1/563; B60R 13/10; B60Q 1/56
   USPC ............................................ 219/202; 40/209
   See application file for complete search history.

(56) References Cited

U.S. PATENT DOCUMENTS

| | | | | |
|---|---|---|---|---|
| 2,171,820 A | * | 9/1939 | White | 40/203 |
| 3,597,591 A | * | 8/1971 | Van Derlip | H05B 3/36 219/528 |
| 3,648,019 A | * | 3/1972 | Brewitz | G03D 13/002 219/386 |
| 4,255,887 A | * | 3/1981 | Murai | B60Q 1/56 315/360 |
| 4,357,650 A | * | 11/1982 | Kano | B60Q 1/56 362/234 |
| 4,891,895 A | * | 1/1990 | DeLaquil, Jr. | B60R 13/10 40/201 |
| 4,894,513 A | * | 1/1990 | Koontz | B32B 17/10036 219/203 |
| 5,004,895 A | * | 4/1991 | Nishino | F24D 13/024 219/528 |
| 5,023,428 A | * | 6/1991 | Hegstad | H05B 3/30 219/213 |
| 5,056,698 A | * | 10/1991 | Kozakevich | B65H 75/36 224/488 |
| 5,255,767 A | * | 10/1993 | Norwood | B60R 11/00 191/12.2 R |
| 5,623,776 A | * | 4/1997 | Lucier | B29B 13/065 40/209 |
| 5,666,749 A | * | 9/1997 | Waters | B60R 13/10 40/204 |
| 5,669,471 A | * | 9/1997 | Unze | H01R 13/72 191/12.2 R |

(Continued)

*Primary Examiner* — Jimmy Chou (74) *Attorney, Agent, or Firm* — Fish & Richardson P.C.

(57) ABSTRACT

A heated license plate holder, includes a frame configured to hold a license plate, the frame comprising an electrically-insulative planar surface, a heating element thermally responsive to an application of electrical power and disposed on the electrically-insulative planar surface, an electrically-insulative layer disposed on a top side of the heating element, and an electrical circuit for applying electrical power to the heating element.

9 Claims, 9 Drawing Sheets

(56) References Cited

U.S. PATENT DOCUMENTS

| | | | | |
|---|---|---|---|---|
| 5,803,216 A * | 9/1998 | McNaught | | H01R 13/66 |
| | | | | 191/12.4 |
| 5,887,119 A * | 3/1999 | Wesseltoft | | F24D 13/022 |
| | | | | 392/436 |
| 6,015,965 A * | 1/2000 | Miller | | H01Q 1/02 |
| | | | | 219/213 |
| 6,264,016 B1 * | 7/2001 | Bales | | B60R 11/02 |
| | | | | 191/12.4 |
| 6,286,238 B1 * | 9/2001 | Harrington | | B60R 13/105 |
| | | | | 40/201 |
| 6,452,138 B1 * | 9/2002 | Kochman | | A41D 13/0051 |
| | | | | 219/529 |
| 6,760,986 B1 * | 7/2004 | MacNeil | | G09F 7/002 |
| | | | | 277/641 |
| 6,854,575 B1 * | 2/2005 | Desormeaux | | B60L 53/16 |
| | | | | 191/12.4 |
| 7,535,343 B1 * | 5/2009 | Pinckney | | B60R 13/00 |
| | | | | 340/425.5 |
| 7,607,248 B2 * | 10/2009 | MacNeil | | G09F 7/002 |
| | | | | 40/209 |
| 7,673,814 B2 * | 3/2010 | Shank | | B05B 12/10 |
| | | | | 239/284.1 |
| 9,004,247 B2 * | 4/2015 | Wang | | H02G 11/003 |
| | | | | 191/12.2 R |
| 9,136,684 B2 * | 9/2015 | Giles | | B60R 13/105 |
| 10,682,967 B2 * | 6/2020 | Batten | | G09G 5/00 |
| 2002/0153368 A1 * | 10/2002 | Gardner | | B32B 17/04 |
| | | | | 219/545 |
| 2005/0093684 A1 * | 5/2005 | Cunnien | | B60Q 1/56 |
| | | | | 340/435 |
| 2006/0086710 A1 * | 4/2006 | Meiler | | H05B 3/146 |
| | | | | 219/202 |
| 2006/0086715 A1 * | 4/2006 | Briggs | | B64D 15/14 |
| | | | | 219/488 |
| 2006/0207131 A1 * | 9/2006 | MacNeil | | B60R 13/10 |
| | | | | 40/209 |
| 2006/0213100 A1 * | 9/2006 | McCann | | G09F 21/04 |
| | | | | 40/591 |
| 2006/0249505 A1 * | 11/2006 | Reusche | | A01K 63/065 |
| | | | | 219/441 |
| 2007/0108189 A1 * | 5/2007 | Cheng | | A47J 36/2466 |
| | | | | 219/543 |
| 2007/0209244 A1 * | 9/2007 | Prollius | | G09F 13/16 |
| | | | | 40/209 |
| 2009/0200285 A1 * | 8/2009 | Raidt | | F24D 13/022 |
| | | | | 219/213 |
| 2010/0101123 A1 * | 4/2010 | Pacleb | | B60R 13/105 |
| | | | | 40/209 |
| 2010/0132232 A1 * | 6/2010 | Frisch | | G02B 6/0041 |
| | | | | 40/208 |
| 2011/0056924 A1 * | 3/2011 | Townsend | | H05B 3/84 |
| | | | | 219/213 |
| 2011/0078933 A1 * | 4/2011 | Lukawitz | | B60Q 1/56 |
| | | | | 40/204 |
| 2011/0252675 A1 * | 10/2011 | Thomas | | B60R 13/10 |
| | | | | 40/205 |
| 2011/0289806 A1 * | 12/2011 | Kuo | | B60R 13/105 |
| | | | | 40/204 |
| 2011/0291822 A1 * | 12/2011 | Boston | | B60Q 1/503 |
| | | | | 340/425.5 |
| 2012/0073168 A1 * | 3/2012 | Rogero | | B60R 13/105 |
| | | | | 40/205 |
| 2013/0001211 A1 * | 1/2013 | Lewis | | H05B 3/36 |
| | | | | 219/201 |
| 2015/0075043 A1 * | 3/2015 | Marko, Jr. | | B60R 13/105 |
| | | | | 40/209 |
| 2015/0101316 A1 * | 4/2015 | Seaton | | H01C 7/008 |
| | | | | 60/295 |
| 2015/0158420 A1 * | 6/2015 | Sim | | B60Q 1/56 |
| | | | | 40/204 |
| 2015/0246636 A1 * | 9/2015 | Shigaki | | B60R 13/105 |
| | | | | 40/206 |
| 2015/0294603 A1 * | 10/2015 | Braunstein | | G09F 13/005 |
| | | | | 315/86 |
| 2016/0046264 A1 * | 2/2016 | Shank | | B05B 9/002 |
| | | | | 15/250.05 |
| 2016/0084986 A1 * | 3/2016 | Zach | | E04H 9/16 |
| | | | | 219/502 |
| 2016/0135251 A1 * | 5/2016 | Hopwood | | A41D 13/0051 |
| | | | | 219/211 |
| 2018/0186309 A1 * | 7/2018 | Batten | | B60Q 1/56 |

* cited by examiner

HEATED LICENSE PLATE SYSTEM

CROSS REFERENCE TO RELATED APPLICATIONS

This patent application claims the benefit of U.S. Provisional Patent Application No. 62/622,406, entitled, "A license plate case with a built in defroster/heater designed to melt snow and ice" by Orazem, filed on Jan. 26, 2018, which is incorporated herein by reference.

BACKGROUND

During the winter months in colder climates, snow and/or ice can build up on the exterior surfaces of a vehicle, such as the license plate. Ice and snow build-up can obscure the important details of a license plate, which can result in a ticket for violating the law in some jurisdictions.

SUMMARY

In some aspects of the present description, a heated license plate holder is provided, including a frame configured to hold a license plate, the frame having an electrically-insulative planar surface, a heating element thermally responsive to an application of electrical power disposed on the electrically-insulative planar surface, an electrically-insulative layer disposed on top of the heating element, and an electrical circuit for applying electrical power to the heating element.

In some aspects of the present description, a heating system for a vehicle registration plate is provided, including a first electrically-insulative substrate, a second electrically-insulative substrate, and a heating element thermally responsive to an application of electrical power, the heating element disposed between the first and second electrically-insulative substrates, wherein the heating system delivers heat to the vehicle registration plate when mounted between the vehicle registration plate and an exterior surface of a vehicle.

In some aspects of the present descriptions, a method of heating a vehicle registration plate is provided, including the steps of creating a vehicle registration plate heater by disposing a heating element between a first electrically-insulative substrate and a second electrically-insulative substrate, supplying an electrical current to the vehicle registration plate heater using an electrical circuit, and mounting the vehicle registration plate heater between a vehicle registration plate and an exterior surface of a vehicle.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In the following disclosure, the terms "license plate" and "vehicle registration plate" shall be considered synonymous and shall be used interchangeably. A "license plate" or "vehicle registration plate" shall be defined to be any plate or sign attached to a motor vehicle or a vehicle accessory (e.g., a trailer) for the purposes of providing identifying information (e.g., governmental vehicle registration number) or for entertainment purposes (e.g., a favorite football team). In the following disclosure, the terms "frame", "case", and "holder" shall be considered synonymous and shall be used interchangeably. Each of these terms shall be used to refer to an open, box-like component with raised edges and/or retaining features which extend up out of the plane created by a vehicle registration plate for the purpose of holding, supporting, and/or protecting the edges of a vehicle registration plate disposed within.

According to some aspects of the present description, a heated license plate holder includes a frame having an electrically-insulative planar surface configured to hold a license plate, a heating element thermally responsive to an application of electrical power disposed on the electrically-insulative planar surface, an electrically-insulative layer disposed on top of the heating element, and an electrical circuit for applying electrical power to the heating element. The heating element is thus disposed between the electrically-insulative planar surface and the electrically insulating layer. The electrical circuit may include, but not be limited to, an electronic control unit, a power source, one or more user controls, one or more sensors, a fuse or circuit breaker, or any combination thereof. The electronic control unit may include software and/or hardware functions which may include, but not be limited to, power management, timing and automatic shutoff control, input/output management, sensor processing, temperature control, or any combination thereof.

According to some aspects of the present description, a heating system for a vehicle registration plate includes a first electrically-insulative substrate, a second electrically-insulative substrate, and a heating element thermally responsive to an application of electrical power, the heating element disposed between the first and second electrically-insulative substrates. In some aspects of the present description, the heating system may deliver heat to the vehicle registration plate when it is mounted between the vehicle registration plate and an exterior surface of a vehicle (e.g., a vehicle bumper).

Figure 1:
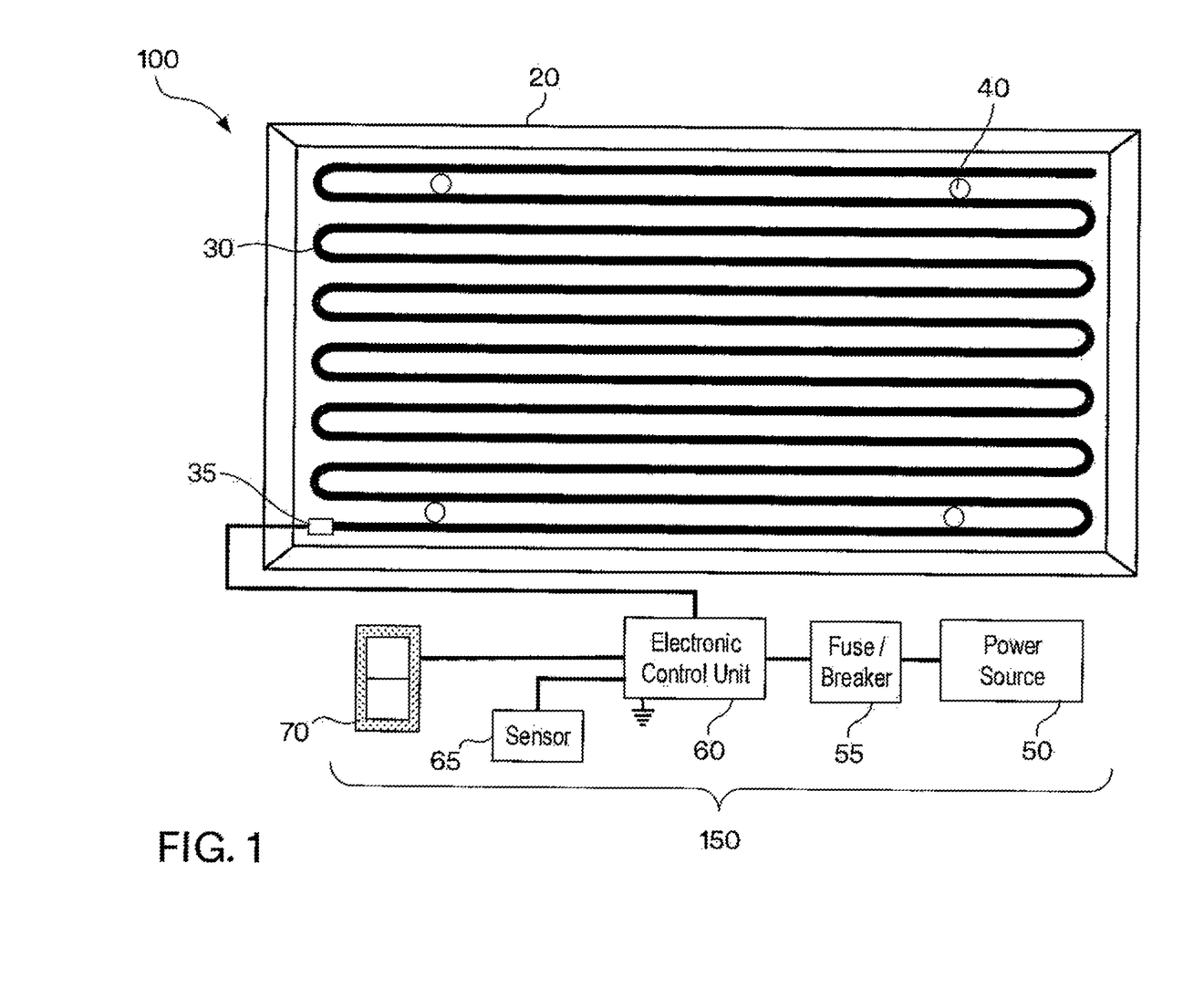
FIG. 1 is a block diagram of a heated holder for a vehicle registration plate in accordance with embodiments as described herein.

According to some aspects of the present description, method of heating a vehicle registration plate includes the steps of creating a vehicle registration plate heater by disposing a heating element between a first electrically-insulative substrate and a second electrically-insulative substrate, supplying an electrical current to the vehicle registration plate heater using an electrical circuit, and mounting the vehicle registration plate heater between a vehicle registration plate and an exterior surface of a vehicle. The first electrically-insulative substrate may, in some embodiments, be an electrically-insulative surface of a license plate frame or case (i.e., a license plate holder). In other embodiments, the first electrically-insulative substrate, heating elements, and second electrically-insulative element may be integral to a license plate frame or case. FIG. 1 is a block diagram of a heated license plate holder for a vehicle registration plate. A license plate holder 100, includes a heating element 30, disposed in a frame 20, and an electrical circuit 150 for applying electrical power to the heating element. The heating element 30 is thermally responsive to the application of electrical power from the electrical circuit 150. That is, current supplied by the electrical circuit 150 running through the heating element 30 generates heat through the process of resistive heating, also known as Joule heating. Current passing through the heating element 30 encounters electrical resistance from the material from which the element 30 is constructed, converting some of the electrical energy into heat energy which is radiated out from the heating element 30.

In some embodiments, the material from which a heating element 30 is manufactured should has a relatively high resistance and a high melting point. Example materials which may be good materials for the heating element 30 include, but are not limited to, nichrome (e.g., 80% nickel, 20% chromium), cupronickel (CuNi), kanthal (FeCrAl), molybdenum disilicide ($MoSi_2$), or any other appropriate material.

In some embodiments, the license plate holder frame 20 may have mounting holes 40, through which screws, bolts, or other fasteners may be placed to attach the license plate holder 100 to a vehicle. The license plate holder frame 20 may be constructed of an electrically-insulative material, or may have a surface (e.g., the back, inner surface of the frame, against which the heating element 30 is disposed) constructed of an electrically-insulative material. This prevents the electrically-conductive heating element 30 from making contact with a metallic or otherwise electrically-conductive surface, such as a vehicle bumper or mounting screw.

The electrically-insulative material may be any appropriate material which is an electrical insulator including, but not limited to, polymers such as polystyrene, polypropylene, polyvinyl chloride, polymethyl methacrylate, polycarbonate, nylons, and epoxies, including "doped" versions of these polymers which contain other materials in order to change the electrical and thermal properties of the materials.

The heating element 30 may be connected to the electrical circuit 150 via an electrical connector 35. In some embodiments, the electrical circuit 150 may include an electronic control unit 60, a fuse/circuit breaker 55, a power source 50, one or more sensors 65, a user control 70, or any combination thereof. The electronic control unit 60 may provide a variety of functions, including, but not limited to, power management and automatic timing functions. The electronic control unit 60 will be discussed in additional detail shortly.

In some embodiments, the user control 70 may be any appropriate type of control which allows a user to send commands to the electrical circuit 150, such as an on/off control (e.g., a momentary rocker switch or pushbutton) to start the flow of current through the heating element 30. In other embodiments, the flow of current may be automatically initiated, perhaps based on input from a sensor 65 mounted on or near the license plate holder 100, whether or not a user control 70 is present.

In some embodiments, the one or more sensors 65 included in the electrical circuit 150 may include, but not be limited to, a temperature sensor, an optical sensor, an imaging device (e.g., a camera or charge-coupled device), and/or a device for sensing a change in an electrical characteristic present on or near the vehicle registration plate (e.g., a change in resistance or capacitance caused by the presence of water, ice, or snow on the surface of the plate). In an example, the electrical circuit 150 may supply electrical current to the heating element 30 of the heated license plate holder 100 when a sensor 65 detects a change in condition which may indicate the presence of snow and/or ice on the surface of the license plate. For example, a temperature sensor may detect a temperature cold enough to support the formation of ice on the plate. In another example, an optical sensor may be used to determine when an amount of snow/ice is covering a surface of the license plate (i.e., diminishing an amount of light sensed by the optical sensor when no snow/ice is present). In another example, an imaging device may be used to capture images of the vehicle registration plate, which can be analyzed by the electrical circuit 150 to determine if identification information has been obscured. In yet another example, a simple device such as an electrical detection circuit, including a voltage source and two electrical conductors forming an open circuit, may detect a presence of snow/ice when an amount of snow/ice bridges the gap between the conductors, closing the circuit and changing the resistance or current measured within the circuit.

Figure 2:
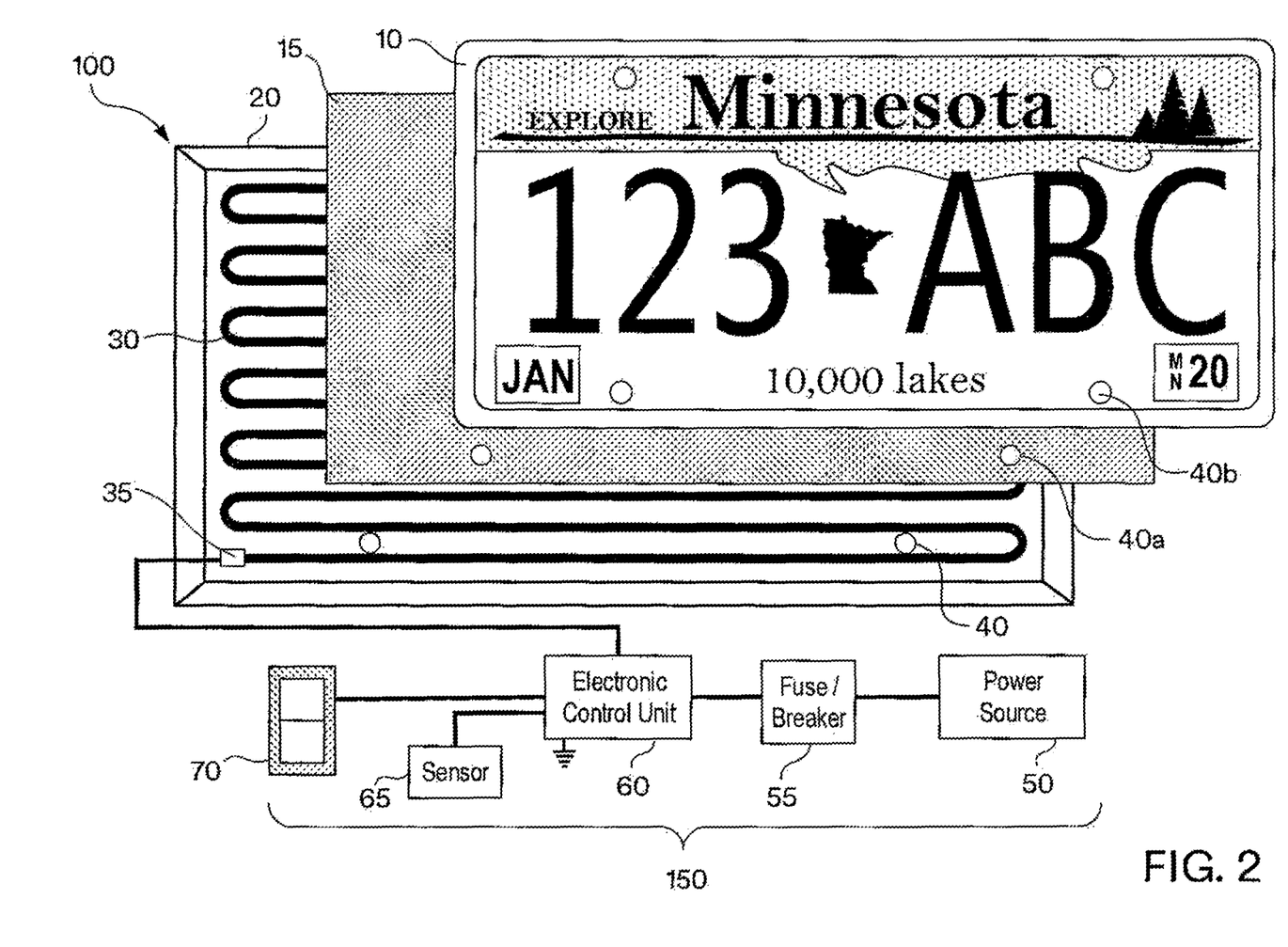
FIG. 2 is a front exploded view of a heating system for a vehicle registration plate in accordance with embodiments as described herein.

FIG. 2 is a front exploded view of the heated license plate holder 100 for a vehicle registration plate of FIG. 1, showing additional details, including a vehicle registration plate 10. Vehicle registration plate 10 may be any plate, tag, or sign displaying license and registration information which may be alphabetic, numeric, bar code, symbol, or any appropriate combination thereof. In some embodiments, the vehicle registration plate 10 may contain mounting holes 40b which are positioned to substantially match the mounting holes 40 of license plate holder 100 for the purposes of mounting the vehicle registration plate 10 to the holder 100 and underlying vehicle. The elements of FIG. 2 which share reference designators with elements of FIG. 1 are identical in description and purpose as to those corresponding elements of FIG. 1, and are thus not discussed in additional detail here.

In some embodiments, an electrically-insulative layer 15 is present, providing electrical isolation of the heating element 30 from possibly electrically conducting materials in the vehicle registration plate 10. The electrically-insulative layer 15 may be any appropriate material which is an electrical insulator while still providing enough thermal conductivity to pass through the layer to melt snow and ice build-up. Examples of such material may include, but are not limited to, polymers such as polystyrene, polypropylene, polyvinyl chloride, polymethyl methacrylate, polycarbonate, nylons, and epoxies, including "doped" versions of these polymers which contain other materials in order to change the electrical and thermal properties of the materials. The electrically-insulative layer 15 may be integral with the frame 20 and/or the heating element 30, or may be a separate layer applied during the final assembly process. The electrically-insulative layer 15 may include mounting holes 40a, which are positioned to substantially match the positions of corresponding mounting holes 40 in license plate holder 100 and mounting holes 40b in vehicle registration plate 10.

Figure 3:
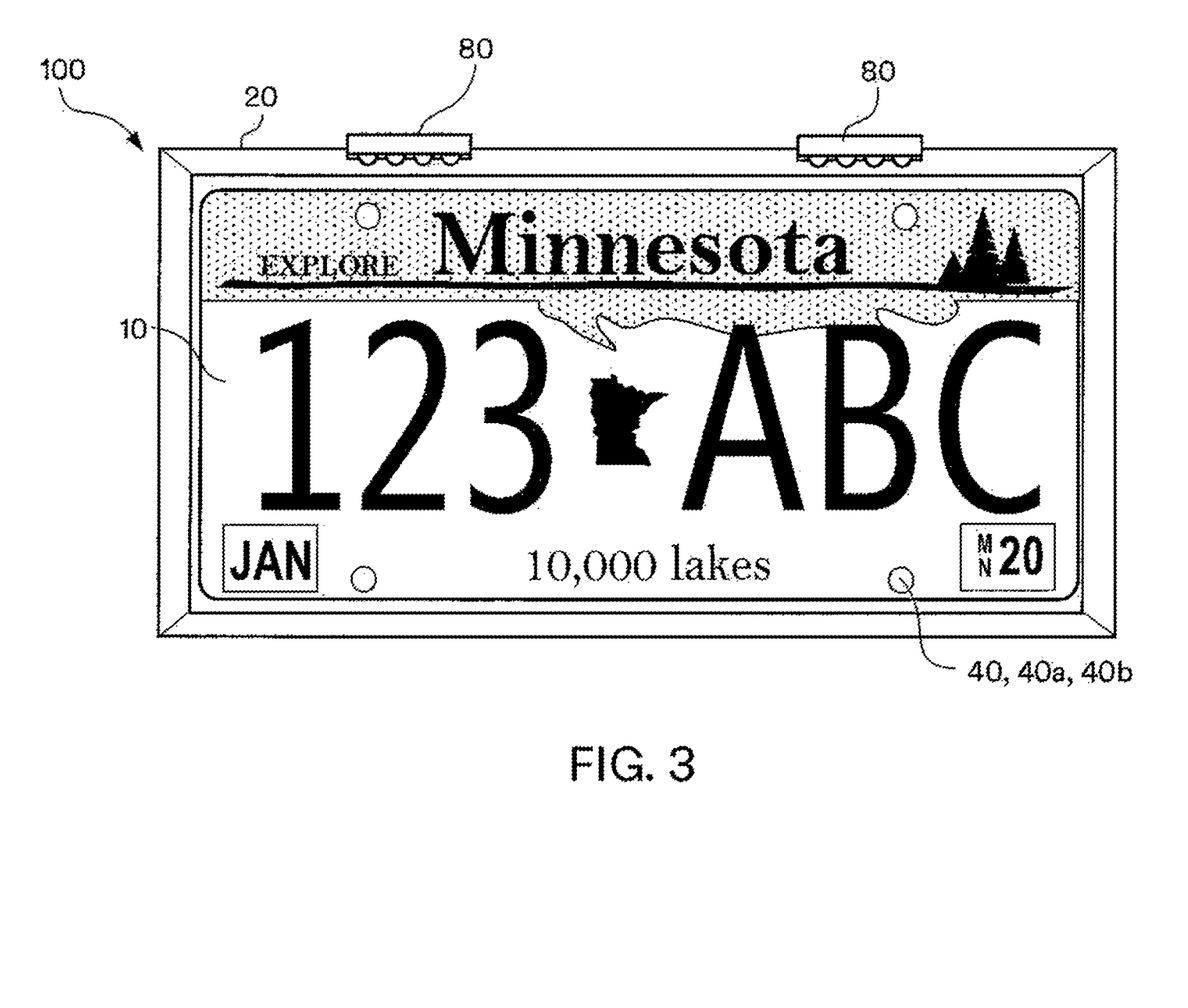
FIG. 3 is a front view of an assembled heating system for a vehicle registration plate with lighting in accordance with embodiments as described herein.

FIG. 3 is a front view of heated license plate holder of FIGS. 1 and 2, but shown fully assembled. When assembled, mounting holes 40b of vehicle registration plate 10 are substantially aligned with mounting holes 40a of electrically-insulative layer 15 (not visible) and mounting holes 40 (not visible) of license plate holder 100, such that the assembly may be mounted on an underlying vehicle or vehicle accessory. In some embodiments, one or more exterior surface lights 80 may be mounted or otherwise co-located with frame 20, the exterior surface lights 80 casting light onto the surface of the vehicle registration plate 10 to illuminate its exterior surface. In some embodiments, the exterior surface lights 80 may be powered by the same electrical circuit (150, FIG. 1) as the license plate holder 100. In other embodiments, exterior surface lights 80 may have a separate power source (for example, solar cells mounted on the license plate holder 100 or underlying vehicle).

Figure 4:
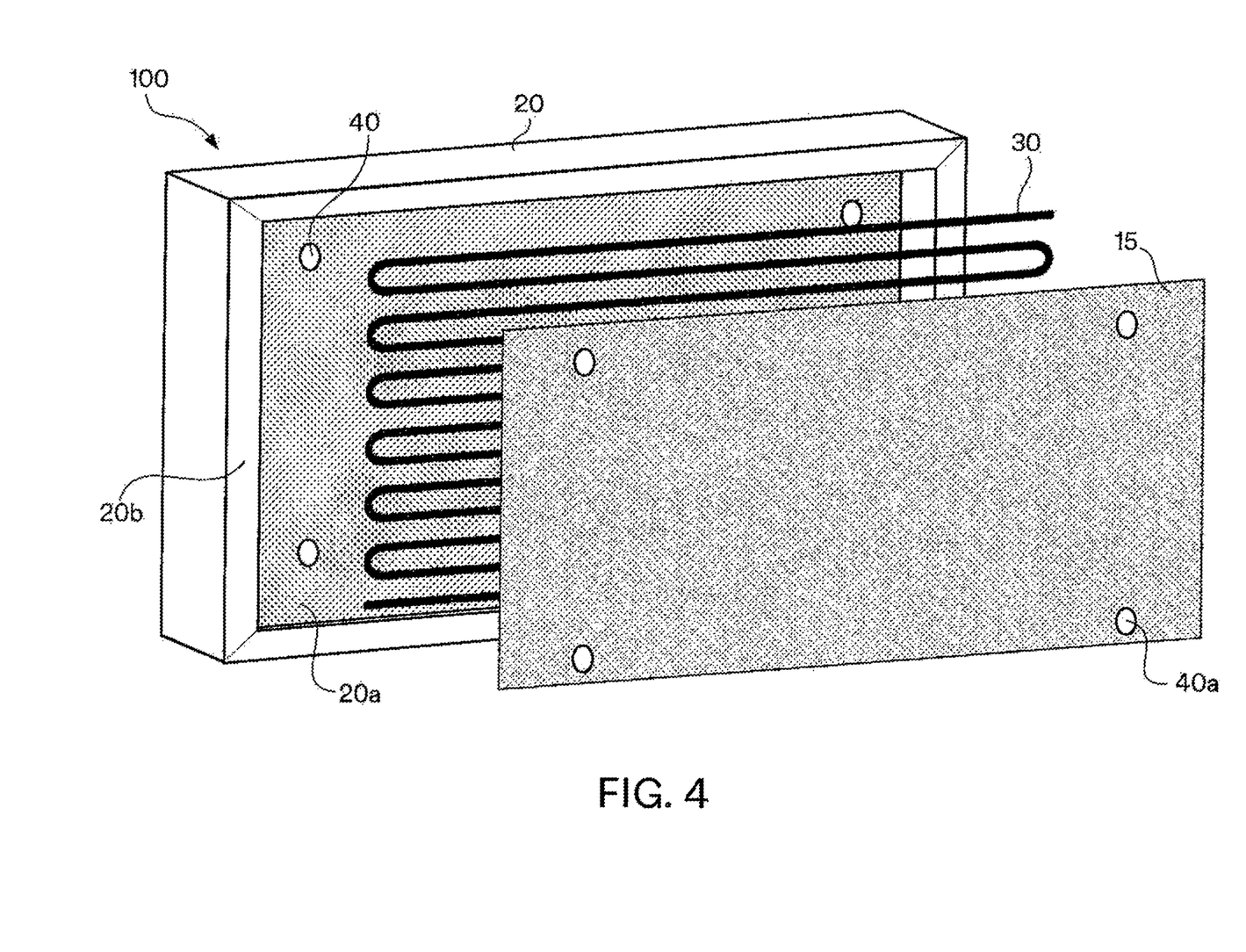
FIG. 4 is an exploded perspective view of a frame and heating element of a heated license plate holder in accordance with embodiments as described herein.
Figure 5:
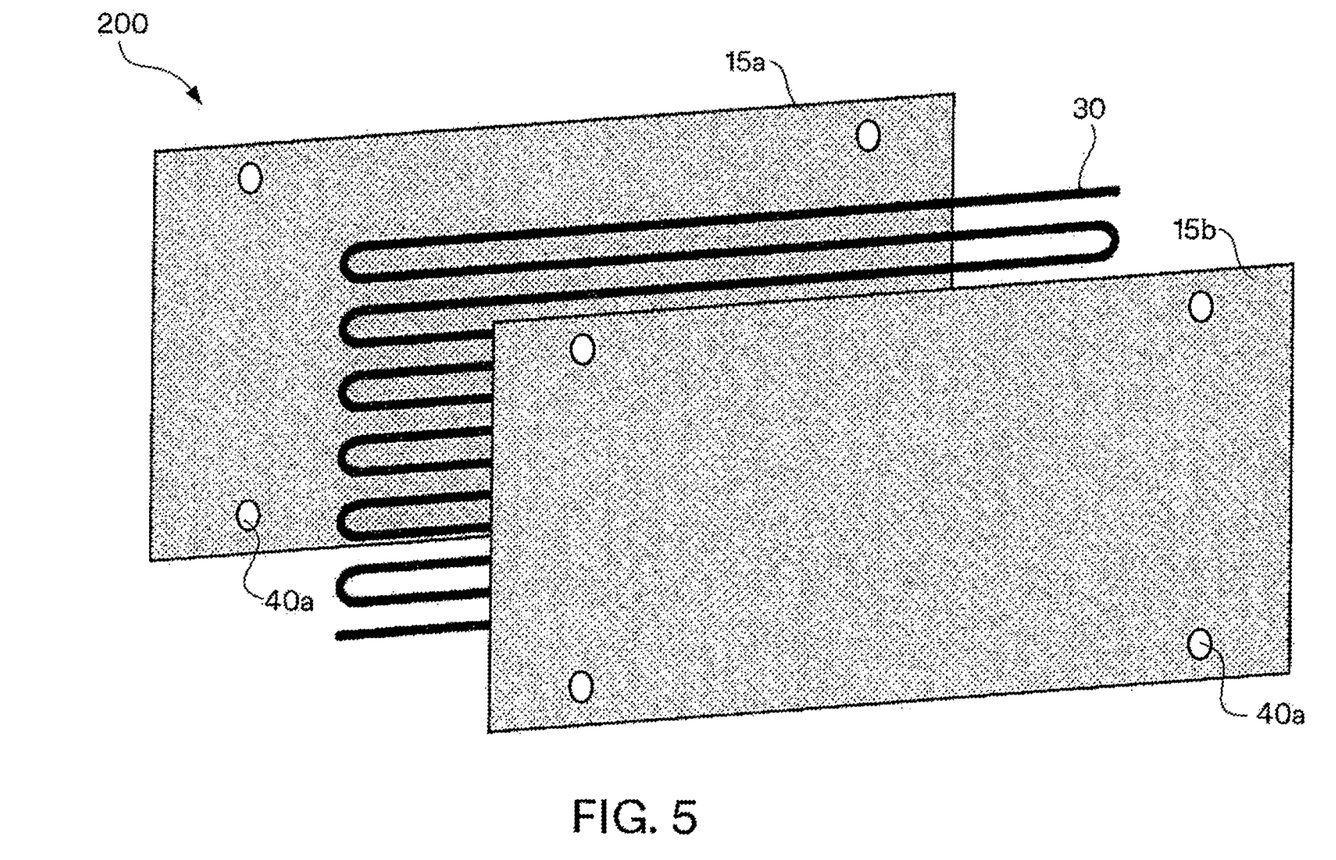
FIG. 5 is an exploded perspective view of a heating system for a vehicle registration plate in accordance with embodiments as described herein.

FIG. 4 is an exploded, perspective view of frame 20, heating element 30, and electrically-insulative layer 15 of the heated license plate holder of FIG. 5. As previously discussed, in some embodiments, frame 20 may itself be constructed of an electrically-insulative material to provide electrical isolation between the electrically-conductive heating element 30 and the surface to which the heated license plate holder 100 is mounted (e.g., the bumper of a motor vehicle). In some embodiments, a surface 20a (such as the interior back surface of frame 20) may be electrically-insulative, instead of the entire frame 20. The heating element is adhered to or otherwise disposed on the electrically-insulative surface 20a, and electrically-insulative layer 15 is disposed over the top of heating element 30, such that heating element 30 is sandwiched between electrically-insulative surface 20a and electrically-insulative layer 15. It should be noted that, in some embodiments, it may be important to route the path of heating element 30 such that it avoids proximity to mounting holes 40/40a, to prevent contact between heating element 30 and any mounting devices (e.g., screws, bolts) used to mount the heated license plate holder 100 to an underlying surface. In some embodiments, frame 20 may have frame edges 20b which may retain and/or protect the edges of a vehicle registration plate.

Figure 6:
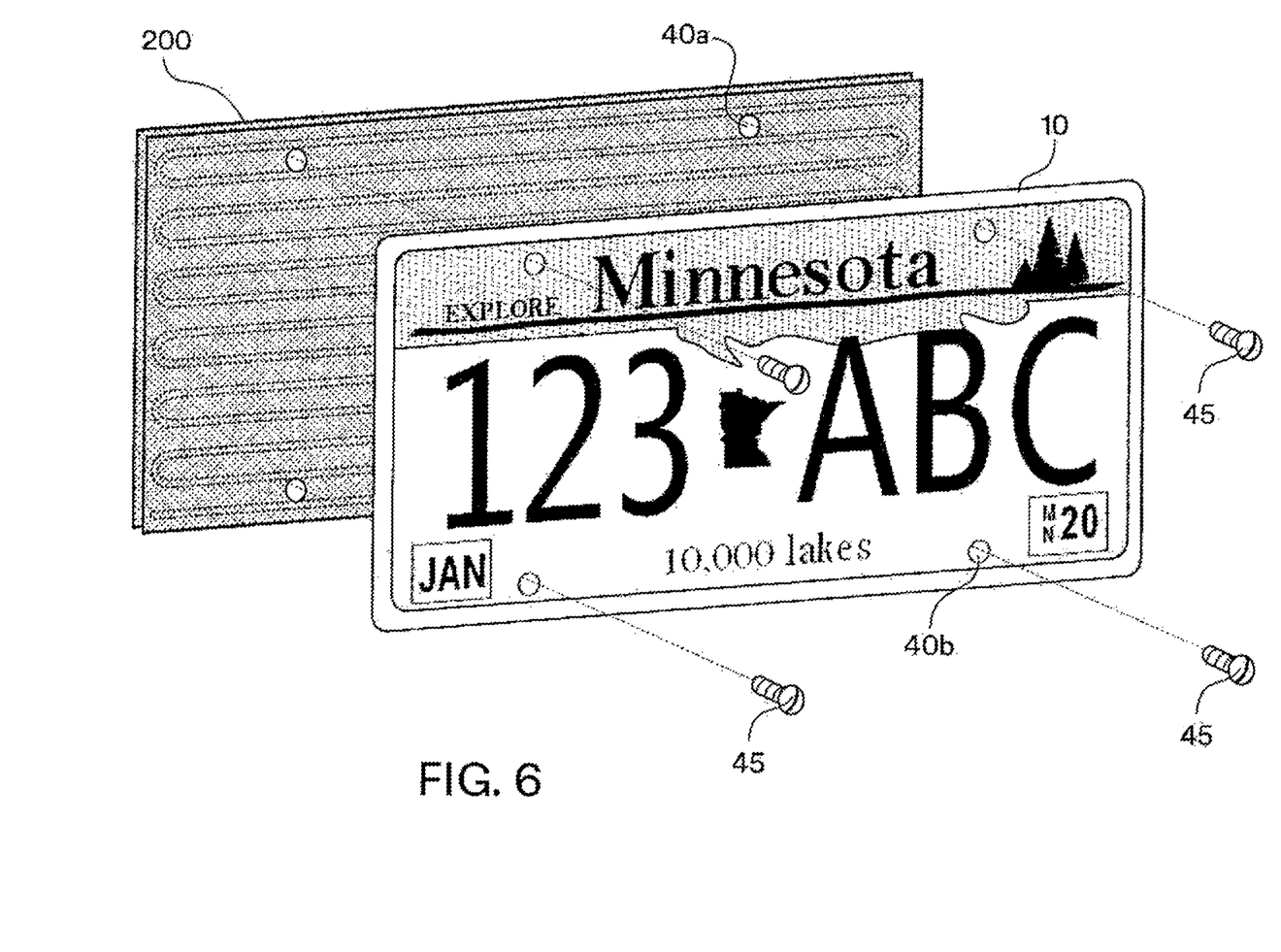
FIG. 6 is a perspective view of a heating system disposed behind a vehicle registration plate when mounting the vehicle registration plate to an exterior surface of a vehicle in accordance with embodiments as described herein.

It should be noted that, in some embodiments, a full holder frame 20 may not be needed to provide heat to a vehicle registration plate. For example, a heating system in the form of a flat plate which is approximately the size of a vehicle registration plate may be mounted between the vehicle registration plate and the surface to which the plate is mounted. FIG. 5 is an exploded, perspective view of one embodiment of such a heating system. In some embodiments, planar heating system 200 may include a heating element 30, sandwiched between a first electrically-insulative surface 15a and a second electrically-insulative surface 15b. This layered stack of materials creates a planar heating system 200 which may be sandwiched between a vehicle registration plate and a surface to which the plate is to be mounted (e.g, the bumper of a motor vehicle). FIG. 6 is a perspective view of the heating system 200 of FIG. 5 shown assembled and disposed behind a vehicle registration plate 10 for mounting the vehicle registration plate 10 to an exterior surface of a vehicle. As shown in FIG. 6, fastening devices 45 (e.g., screws, bolts) may be used to fasten the vehicle registration plate to a vehicle or other appropriate surface. Fastening devices 45 pass through mounting holes 40b of vehicle registration plate 10 and mounting holes 40a of heating system 200.

It should be noted that, like the heated license plate holder 100 of FIGS. 1-4, heating system 200 still requires an electrical circuit (such as circuit 150 of FIGS. 1-2) to supply power to heating element 30. Any of the embodiments of electrical circuit 150 previously discussed may be used with heating system 200.

Figure 7:
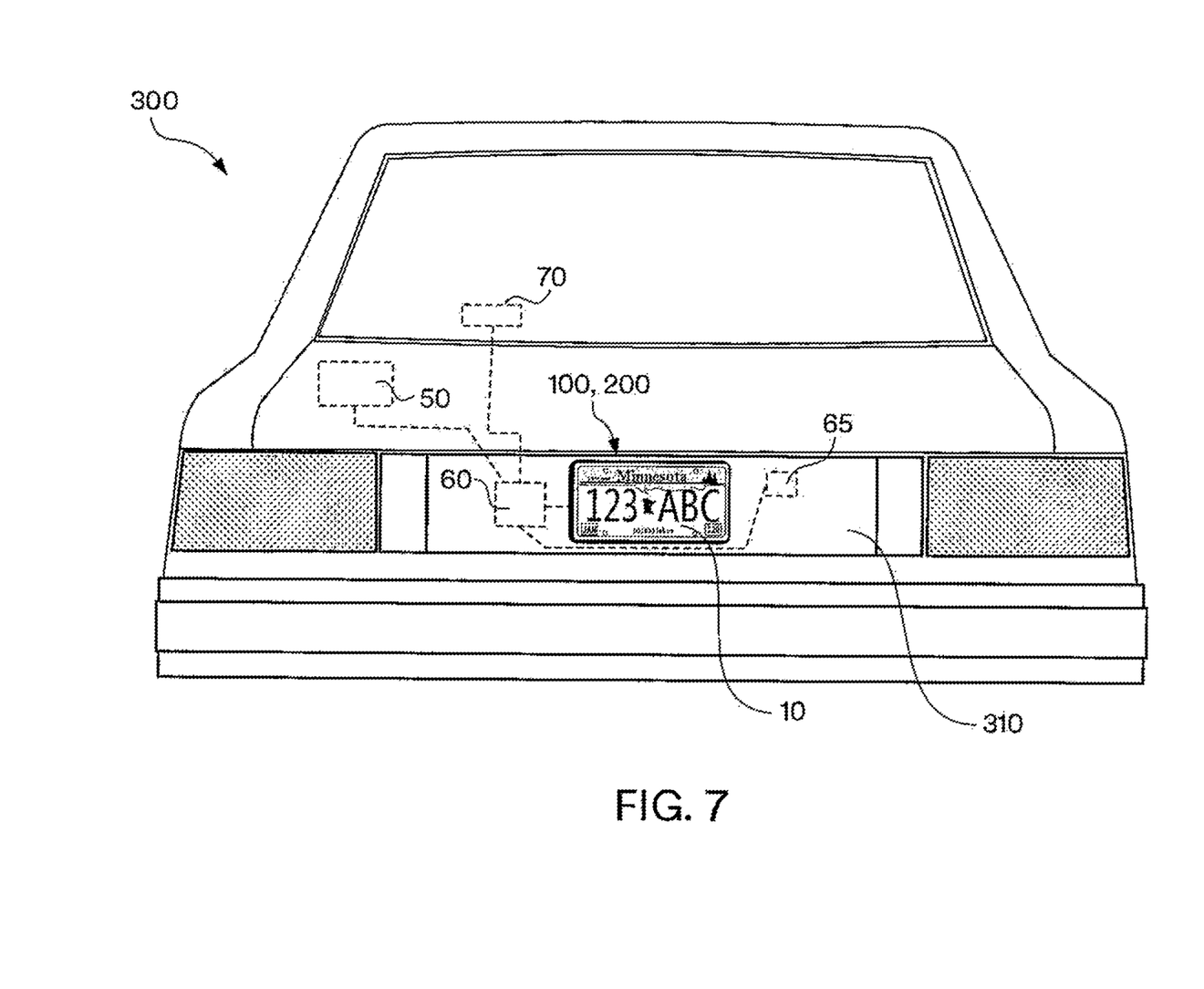
FIG. 7 is a rear view of a vehicle showing possible locations where components of a heating system for a vehicle registration plate may be located in accordance with embodiments as described herein.

FIG. 7 is a rear view of a vehicle 300 showing possible locations where components of a heating system for a vehicle registration plate 10 may be located in accordance with embodiments as described herein. In some embodiments, vehicle registration plate 10 is mounted on a vehicle bumper 310, along with an appropriate heating system (which may be heated license plate holder 100 or heating system 200). Dashed lines are used to indicated how system components may be located, in some embodiments, inside the vehicle 300. In some embodiments, electronic control unit 60 may be located inside vehicle bumper 310. In other embodiments, electronic control unit 60 may be integral to heated license plate holder 100 (or heating system 200, as appropriate). Power source 50 may be a vehicle battery and/or a voltage regulator which regulates power from the vehicle battery or electrical system and provides it to the electronic control unit 60. In some embodiments, user control 70 may be a switch or knob mounted in the dashboard of vehicle 300. Sensor(s) 65 may be mounted on or near heating system 100/200, or on vehicle bumper 310 in relative proximity to heating system 100/200. In should be noted that the component locations shown in FIG. 7 are examples only and are not intended to be limiting. It should also be noted that the number and type of components may vary from those shown in FIG. 7. For example, in some embodiments, the user control 70 may not be present. In such an embodiment, power may be supplied to the heating element automatically by the electronic control unit 60 when an environmental condition is sensed (e.g., the exterior temperature drops below a threshold, or an optical sensor is blocked by snow and ice).

Figure 8:
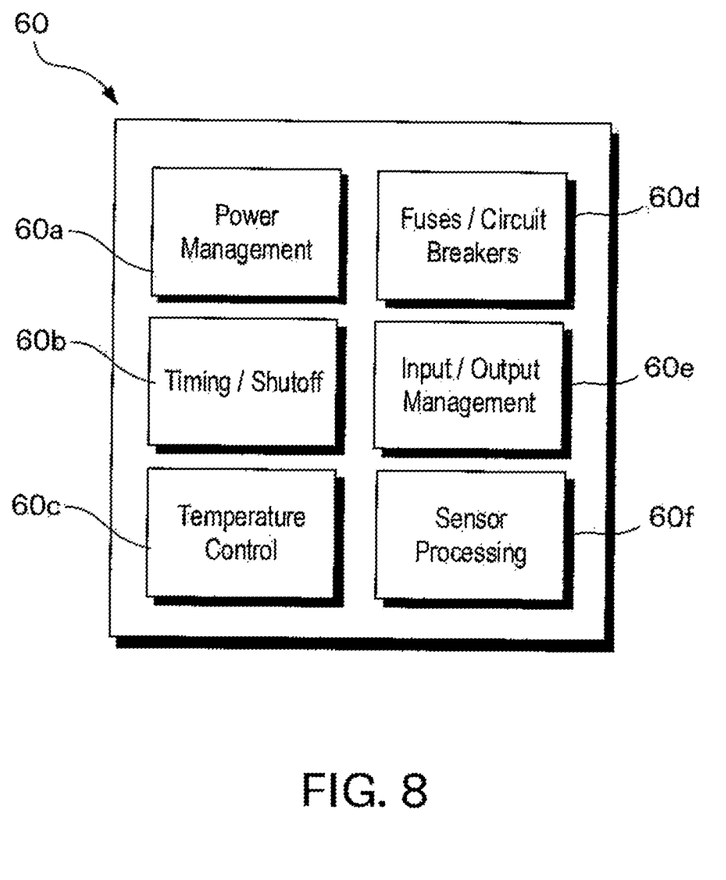
FIG. 8 is a block diagram of an electronic control unit for a heating system in accordance with embodiments as described herein.

FIG. 8 is a block diagram of an electronic control unit (ECU) 60 for a heating system in accordance with embodiments as described herein. In some embodiments, the electronic control unit 60 may include hardware circuits and/or software to provide a variety of functions for the heating system described herein. In some embodiments, ECU 60 may provide a power management function 60a. The power management function 60a may provide functions related to the management and delivery of electrical power to the heating elements, including, but not limited to, power regulation, voltage level conversion, and short circuit/open circuit protection. In some embodiments, ECU 60 may provide a timing/shutoff function 60b, which may control the timing features of the system, such as automatic shutoff of the heating element to prevent overheating. In some embodiments, ECU 60 may provide a temperature control function 60c, which may monitor and regulate the temperature of the heating element and other electrical components of the heating system. In some embodiments, the temperature control function 60c may receive information from sensors (not shown) such as temperature sensors or current sensors in order to provide closed loop control of the heating system temperature. In some embodiments, ECU 60 may provide fuses and/or circuit breakers 60*d* to protect the ECU 60 and its components from overvoltage conditions from, for example, a short circuit. In should be noted that, in some embodiments, fuses and/or circuit breakers 60*d* may be separate and in addition to the fuse/breaker 55 shown in FIGS. 1 and 2. In other embodiments, fuses and/or circuit breakers 60*d* may be the same as fuse/breaker 55 shown in FIGS. 1 and 2, but integrated into ECU 60 instead of as a separate component. In some embodiments, ECU 60 may provide an input/output management function 60*e*, which receives and processes digital and analog inputs (e.g., sensor readings, user commands, etc.) and prepares outputs (such as commands to indicator lights, heating commands, etc.) to be sent by the ECU 60. In some embodiments, ECU 60 may provide additional sensor processing 60*f*, which may include, but not limited to, analysis of image data acquired by an imaging device, detection of light from an optical sensor falling below or rising above a threshold, debouncing of sensor readings, etc.

Figure 9:
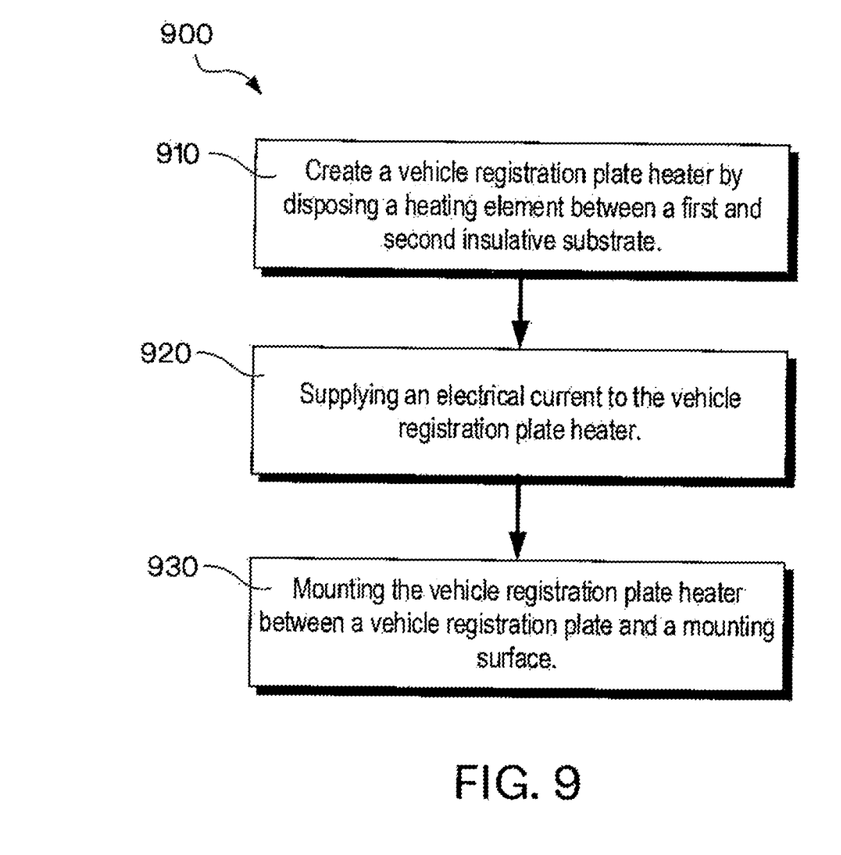
FIG. 9 is a flowchart showing a method of heating a vehicle registration plate in accordance with embodiments as described herein.

Finally, FIG. 9 is a flowchart showing one embodiment of a method 900 of heating a vehicle registration plate in accordance with embodiments as described herein. In step 910, a heater for a vehicle registration plate is created by sandwiching a heating element between a first and second electrically-insulative substrates. In some embodiments, at least one of the first or second electrically-insulative substrates may be a license plate holder having at least one surface composed of an electrically-insulative substrate, as previously described. In step 920, an electrical current is supplied to the heating element within the vehicle registration plate heater. As previously described, this current may be provided by an electrical circuit, such as circuit 150 of FIGS. 1 and 2. In step 930, the vehicle registration plate heater is mounted between a vehicle registration plate and a mounting surface, such as an exterior surface of a vehicle (e.g., a vehicle bumper).

Terms such as "approximately" will be understood in the context in which they are used and described in the present description by one of ordinary skill in the art. If the use of "approximately" as applied to quantities expressing feature sizes, amounts, and physical properties is not otherwise clear to one of ordinary skill in the art in the context in which it is used and described in the present description, "approximately" will be understood to mean within 10 percent of the specified value. A quantity given as about a specified value can be precisely the specified value. For example, if it is not otherwise clear to one of ordinary skill in the art in the context in which it is used and described in the present description, a quantity having a value of approximately 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A heated license plate holder, comprising:
  a license plate frame configured to hold a license plate, the license plate frame comprising four frame edges, four mounting holes, and an electrically-insulative planar surface within the four frame edges;
  a power source connected to an electrical circuit and a heating element in order to supply electrical power for operating the heated license plate holder;
  the heating element thermally responsive to the electrical power and comprising nichrome, cupronickel, kanthal, or molybdenum disilicide, the heating element disposed on the electrically-insulative planar surface and within the four frame edges;
  an electrically-insulative layer comprising a first insulative layer and a second insulative layer, the heating element sandwiched between the first and second insulative layers, the electrically-insulative layer comprising a polymer and defining four mounting holes that are substantially aligned with the four mounting holes of the license plate frame;
  fastening devices comprising bolts or screws configured to pass through the four mounting holes of the license plate frame and the four mounting holes of the electrically-insulative layer;
  an exterior surface light for directing light onto an exterior surface of the heated license plate holder or license plate frame, wherein the exterior surface light is powered by a separate power source mounted on the license plate holder or an underlying vehicle; and
  the electrical circuit comprising an optical sensor, the electrical circuit configured for automatically initiating the application of electrical power to the heating element in response to an amount of light sensed by the optical sensor,
  wherein the electrical circuit comprises a user control and an electronic control unit,
  wherein the electronic control unit comprises a timer shutoff function for automatically stopping the application of the electrical power to the heating element to prevent overheating.

2. The heated license plate holder of claim 1, wherein the electrically-insulative planar surface is sized to substantially match an area of the license plate.

3. The heated license plate holder of claim 1, wherein the electrical circuit comprises a fuse.

4. The heated license plate holder of claim 1, wherein the electrical circuit comprises one or more additional sensors.

5. The heated license plate holder of claim 1, wherein the electronic control unit is integral to the license plate frame.

6. The heated license plate holder of claim 1, wherein the electronic control unit is located remotely from the license plate frame.

7. A heated license plate holder, comprising:
- a license plate frame configured to hold a license plate, the license plate frame comprising four frame edges, four mounting holes, and an electrically-insulative planar surface within the four frame edges;
- a power source connected to an electrical circuit and a heating element in order to supply electrical power for operating the heated license plate holder;
- the heating element thermally responsive to the electrical power and comprising nichrome, cupronickel, kanthal, or molybdenum disilicide, the heating element disposed on the electrically-insulative planar surface and within the four frame edges;
- an electrically-insulative layer comprising a first insulative layer and a second insulative layer, the heating element sandwiched between the first and second insulative layers, the electrically-insulative layer comprising a polymer and defining four mounting holes that are substantially aligned with the four mounting holes of the license plate frame;
- fastening devices comprising bolts or screws configured to pass through the four mounting holes of the license plate frame and the four mounting holes of the electrically-insulative layer;
- an exterior surface light for directing light onto an exterior surface of the heated license plate holder or license plate frame, wherein the exterior surface light is powered by a separate power source mounted on the license plate holder or an underlying vehicle; and
- the electrical circuit comprising a device for sensing a change in resistance or capacitance caused by a presence of water, ice or snow, the electrical circuit configured to automatically initiate the application of the electrical power to the heating element in response to a detection of the presence of water, ice or snow by the device,
- wherein the electrical circuit comprises a user control and an electronic control unit,
- wherein the electronic control unit comprises a timer shutoff function for automatically stopping the application of the electrical power to the heating element to prevent overheating.

8. The heated license plate holder of claim 7, wherein the electrical circuit comprises one or more additional sensors.

9. The heated license plate holder of claim 7, wherein the electronic control unit provides closed loop control of a temperature of the heating element by monitoring and regulating the temperature of the heating element.

* * * * *